Figure 1:
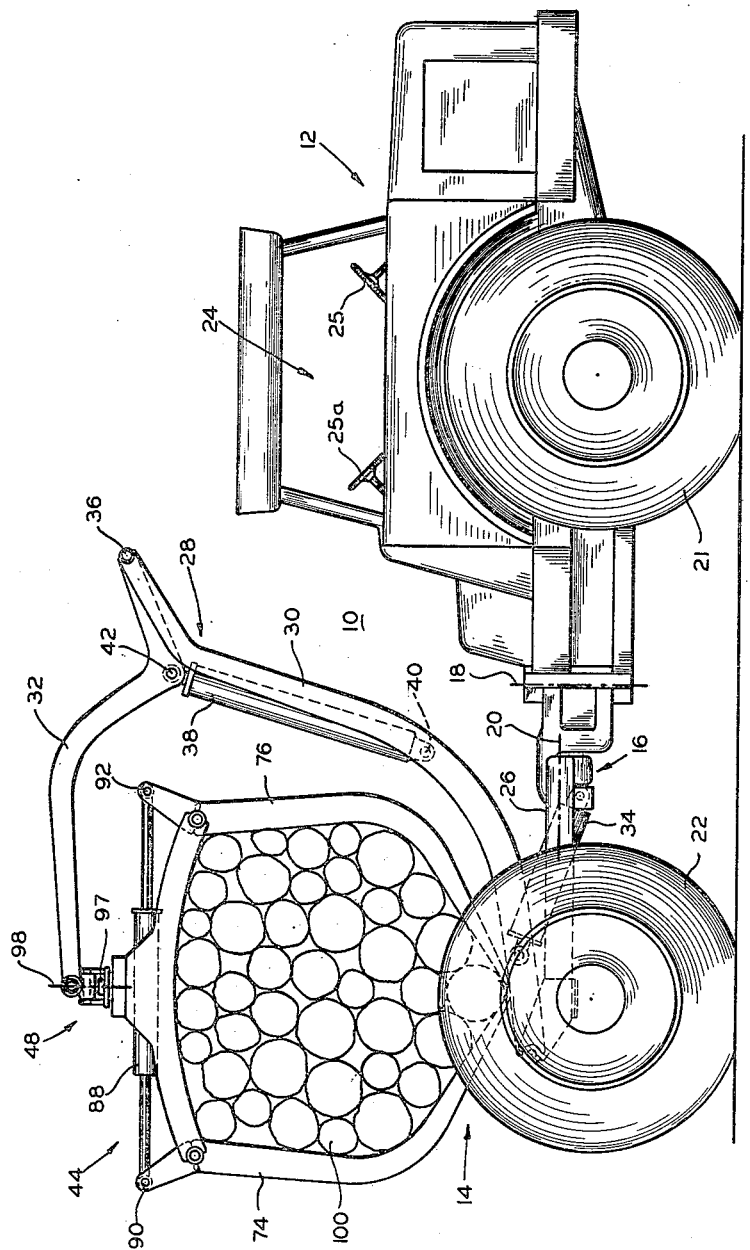

Feb. 26, 1963 C. W. GUSTINE 3,079,020
MATERIAL HANDLING MACHINE
Filed Feb. 27, 1958 6 Sheets-Sheet 5

INVENTOR.
CHARLES W. GUSTINE
BY Kenneth C. Witt
ATTY.

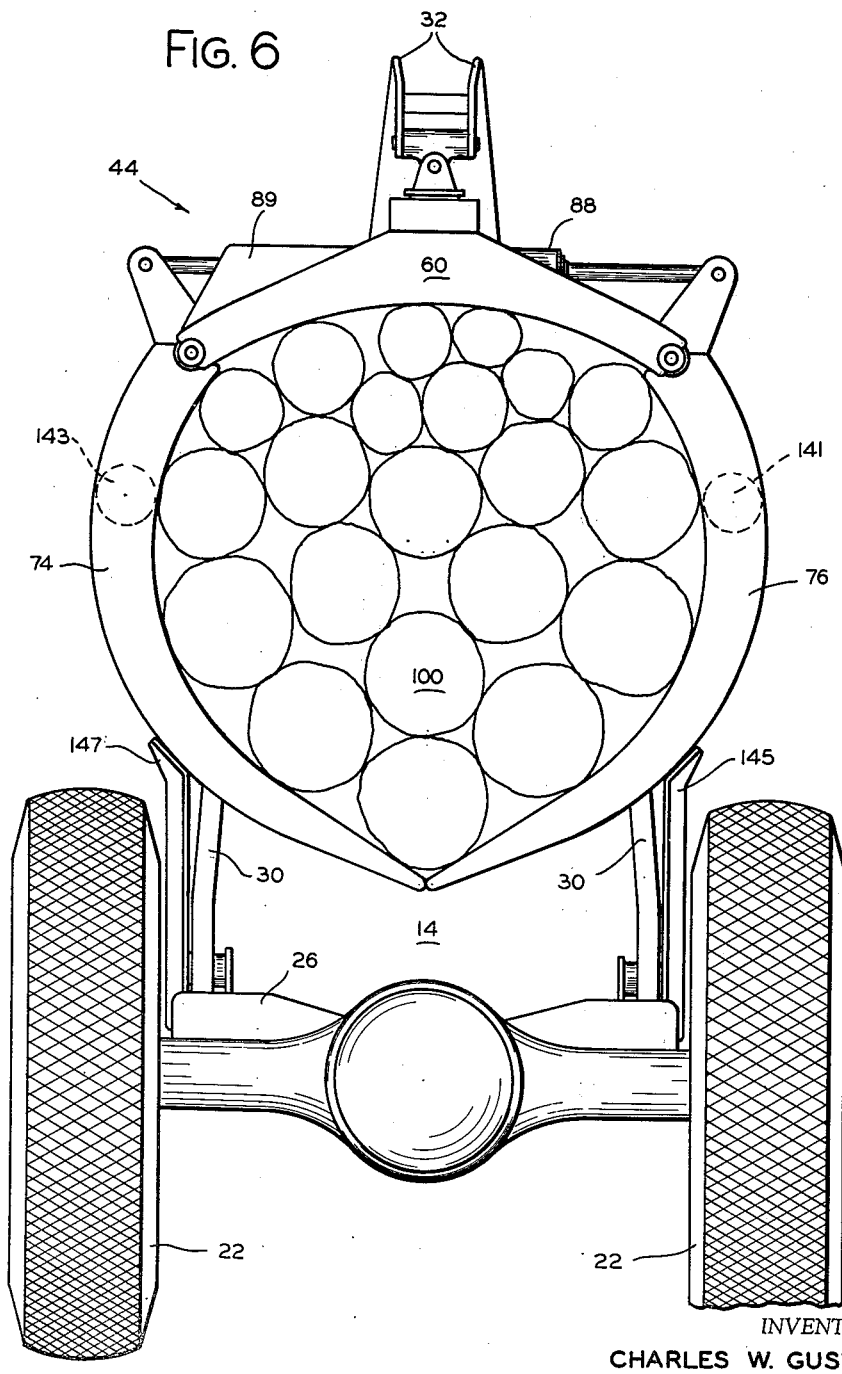

United States Patent Office 3,079,020
Patented Feb. 26, 1963

3,079,020
MATERIAL HANDLING MACHINE
Charles W. Gustine, Niles, Mich., assignor to Clark
Equipment Company, a corporation of Michigan
Filed Feb. 27, 1958, Ser. No. 717,921
3 Claims. (Cl. 214—147)

This invention relates to material handling machines and more particularly to such machines which employ grapples as the load engaging means.

One of the primary uses of my machine is in the handling of pulpwood and the like in connection with lumbering operations; however, it will be readily understood that the machine is not limited to such use but may be employed with equal facility in the handling of lengths of pipe and other elongated objects which lend themselves to handling by means of a grapple. The use of my machine in connection with the handling of pulpwood is described hereinafter in conjunction with a disclosure of preferred embodiments of the invention.

Numerous mechanical devices and machines have been conceived and used heretofore in connection with the handling of logs, pulpwood, and the like, in getting them from the location where they are cut to a main haul road or track where they can be transported on a conventional truck, railroad car or other conventional conveyance. Some of these devices and machines have taken at least a part of the manual labor out of this type of operation and have enabled considerable improvements over prior methods. All of such prior devices and machines of which I am aware, however, have one or more deficiencies in that they still require some manual labor or do not perform all of the necessary operations.

The object of the present invention is to provide a machine requiring only a single operator which is capable of going into the woods, picking up a load of logs, transporting them out to a main road or track, and then loading them on another conveyance at that point.

A more specific object is the provision of a machine which is of relatively short extent but which is capable of negotiating the terrain encountered in logging and other operations, and at the same time is capable of picking up a load, carrying it without spilling, and then depositing the load on a truck or other conveyance.

Other objects, features and advantages of my invention will be apparent from the subsequent description and the accompanying drawing of a preferred embodiment of the invention.

In carrying out my invention in one form I provide a machine which includes a horizontal disposed frame portion and an upwardly disposed articulated boom portion pivotally mounted on the frame. The boom portion includes a first vertically disposed boom member pivoted on the frame and a second rearwardly disposed boom member pivotally connected at the upper end of the first member. Two pairs of fluid actuators are provided, one pair for pivoting the first boom member on the frame and the second pair of pivoting the second boom member on the first. The second boom member carries grapple means at the rearward extremity thereof. The boom portion is arranged so that it may be extended rearwardly to pick up a load with a grapple and then retracted to rest the load on the frame of the machine while it is transported, and then when the destination is reached the boom portion may be raised and extended to deposit the load on a truck or the like.

Figure 2:
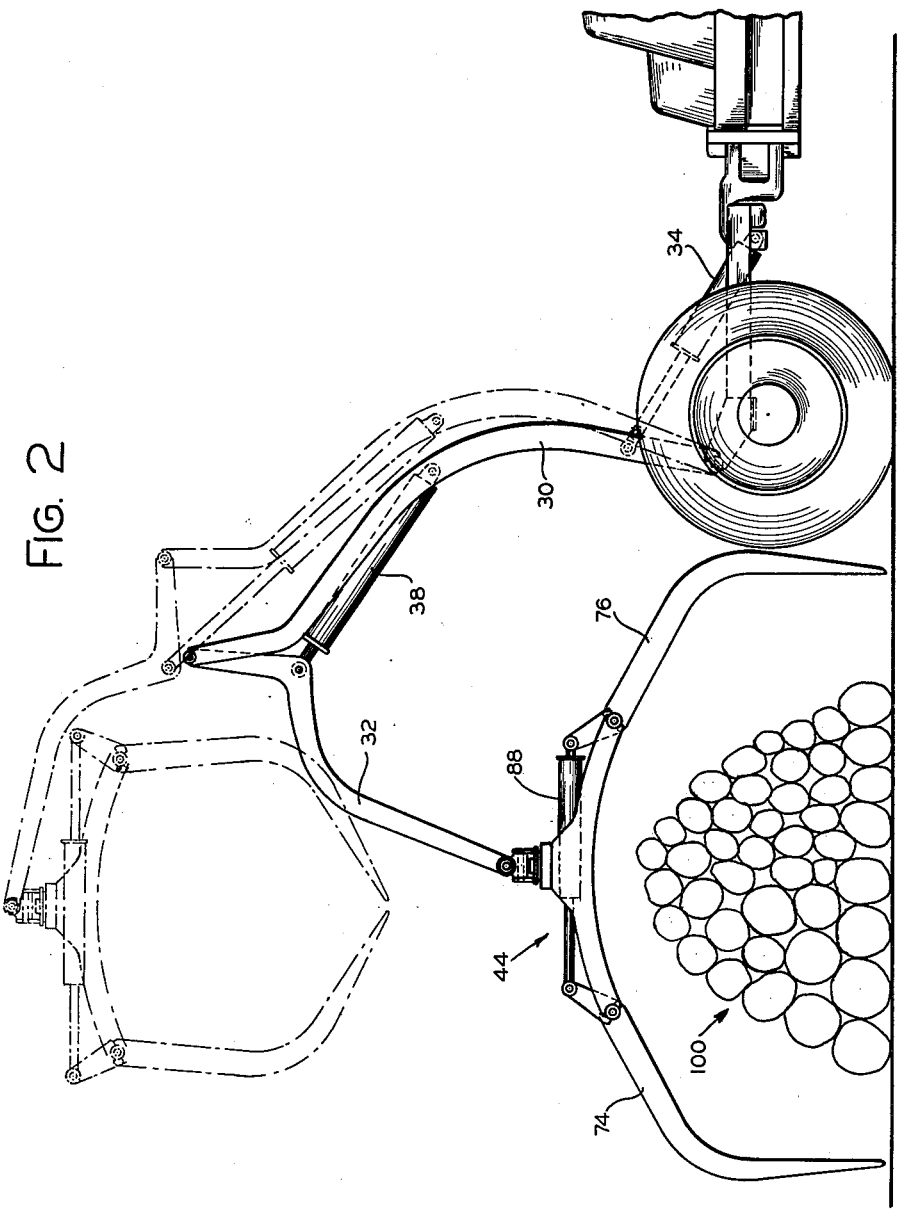
Figure 3:
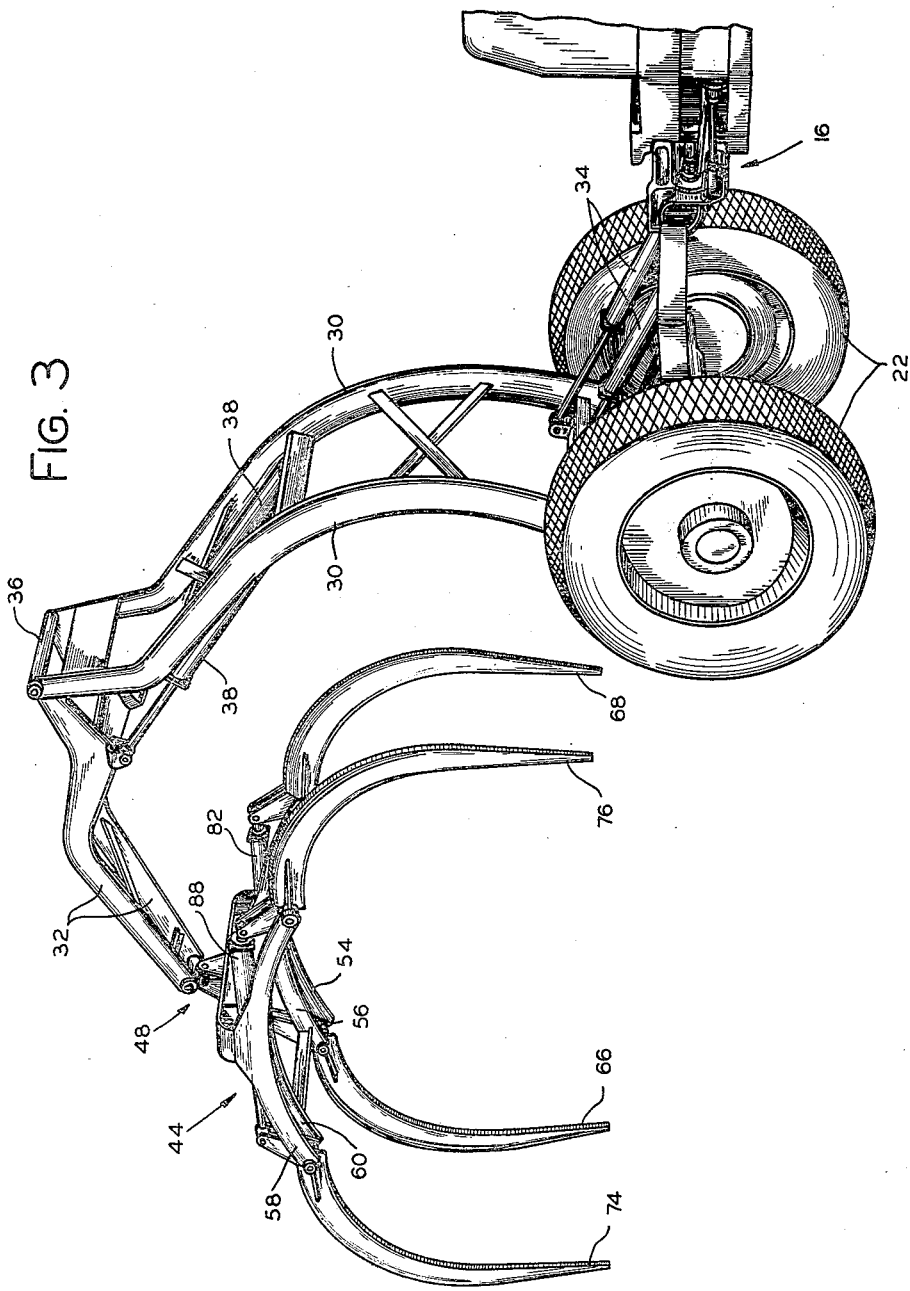
Figure 4:
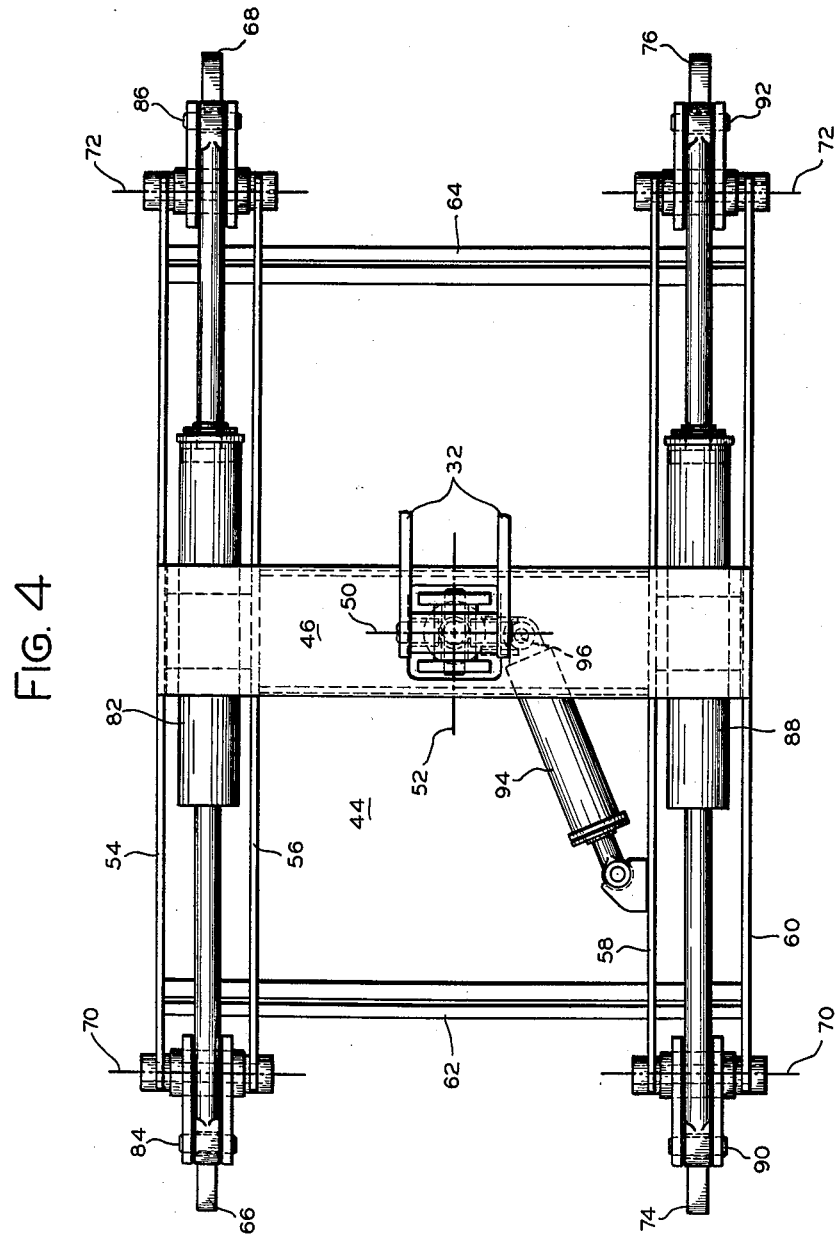
Figure 5:
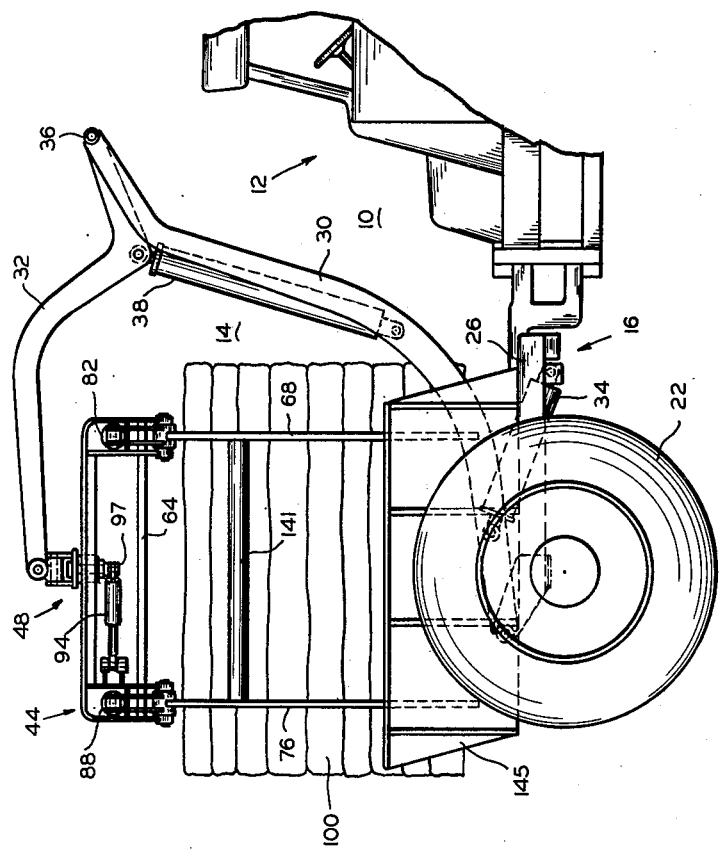
Figure 7:
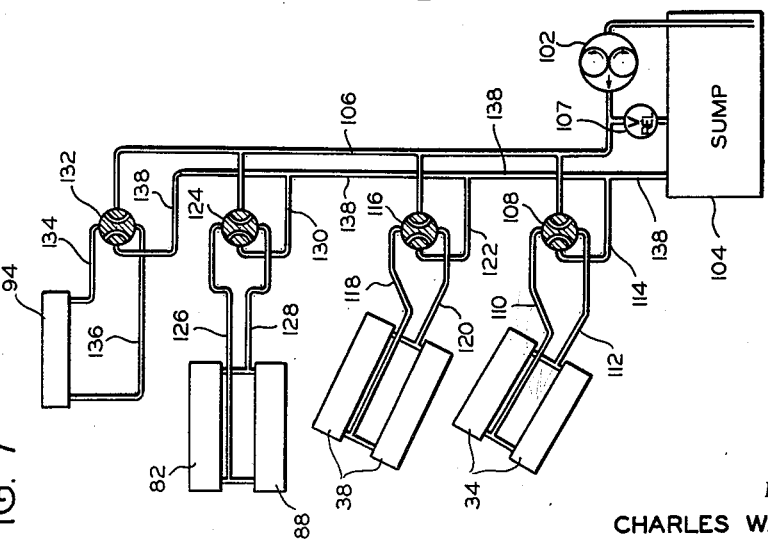

For a clearer and more complete understanding of my invention reference should be had to the accompanying drawing in which:

FIGURE 1 is a side elevation of a machine embodying this invention in one perferred form, FIGURE 2 shows the same machine as FIGURE 1 with the boom portion extended rearwardly in position to pick up a load and also shows in dot-dash lines a raised position of the boom portion, FIGURE 3 is a perspective view of the same machine, FIGURE 4 is a top plan view of the grapple portion of the machine of FIGURE 1, FIGURE 5 is a partial side elevation of a machine embodying another preferred form of the present invention, FIGURE 6 is an end elevation of the machine of FIGURE 5, and FIGURE 7 is a schematic circuit diagram of the fluid circuit of the machines described and illustrated herein.

Referring to FIGURE 1 of the drawing, the numeral 10 indicates generally the complete vehicle which is depicted in this figure. The vehicle includes a two-wheeled tractor portion which is indicated generally by the numeral 12 and a two-wheeled trailer portion 14 which is connected to tractor portion 12 by means of a combined draft and steering coupling 16. The coupling 16, which is of known type, provides for pivoting of trailer portion 14 with respect to tractor portion 12 about the vertically disposed axis 18 and also about the horizontally disposed axis 20. The vehicle is steered by pivoting the trailer 14 on tractor 12 about axis 18 by a suitable power means, while the horizontal pivot connection about axis 20 permits the vehicle to negotiate very rough terrain without any of the four wheels leaving the ground.

The tractor portion 12 of the vehicle includes a suitable prime mover such as a diesel engine, for example, for propelling the vehicle and providing power for operating various power operated devices thereon. A power train of known type including a torque converter, if desired, a transmission, propeller shafts, differentials, and axle shafts, is provided for operating the wheels 21 and 22 of the vehicle from the prime mover. Preferably, both the front wheels 21 (only one of which appears in the drawing) of the tractor and the rear wheels 22 of the trailer are driven wheels. An operator's station 24 is provided on the tractor portion 12 of the vehicle for operating the vehicle to pick up, transport and discharge loads. Preferably, two steering wheels 25 and 25a and dual sets of other controls are provided to facilitate operation of the vehicle in either direction, it being understood that while this machine is intended for operation by a single operator, it is advantageous for him to be able to face in either direction.

The trailer part 14 of the vehicle includes a horizontally disposed frame portion 26. At the rear extremity of this frame portion an upwardly disposed boom portion indicated generally by the numeral 28 is pivotally mounted. The boom portion 28 includes vertically disposed curved boom member 30 and a rearwardly extending horizontally disposed curved boom member 32. In its retracted position (FIG. 1), the boom portion 28 is C-shaped (the C being backward when the vehicle is viewed from the right side as in FIG. 1) and defines a rearward facing pocket. FIGURE 3 shows these boom members in greater detail and it will be observed that both of them comprise a pair of side pieces joined by cross bracing.

Boom member 30 is moved between the forwardly extending position of FIGURE 1 and the rearwardly extending solid line position of FIGURE 2 by suitable power means which as illustrated comprise a pair of piston and cylinder type hydraulic actuators 34. Boom member 32 is pivoted on member 30 about a cross shaft 36 and power means comprising a pair of piston and cylinder hydraulic actuators 38 is connected between location 40 on member 30 and location 42 on member 32 to pivot the latter member with respect to member 30. FIGURE 1 and the solid line portion of FIGURE 2 illustrate member 32 in a position in which actuators 38 are fully retracted, while the dash-dot lines of FIGURE 2 illustrate a position in which actuators 38 are extended to hold member 32 upwardly and outwardly from member 30.

At the rearward extremity of boom member 32 there is provided a grapple load handling device which is indicated generally by the numeral 44. FIGURE 4 shows a top plan view of the grapple structure. The grapple structure includes a transverse frame member 46 which is connected to member 32 by means of a universal connection at 48 whereby the grapple may pivot with respect to boom member 32 about the transverse horizontally disposed axis 50 and a longitudinal horizontally disposed axis 52. The grapple structure includes a pair of side plates 54 and 56 which appear at the top of FIGURE 4 and a pair of side plates 58 and 60 which appear at the bottom of this figure, all of these side plates being rigidly joined to cross member 46 in a suitable manner such as by welding. A pair of brace members 62 and 64 are joined to the respective ends of the side frame members to provide a rigid frame structure.

Two coacting gripper arms 66 and 68 are pivotally mounted between side plates 54 and 56 to pivot about axes 70 and 72, respectively, while two additional coacting gripper arms 74 and 76 are pivotally mounted between side plates 58 and 60 to pivot about the same axes 70 and 72, respectively. The gripper arms preferably are curved as shown in the drawing to permit them to hold a large load when they are closed. To operate the gripper arms two hydraulic actuators are provided. One of these, indicated by the numeral 82, is connected between the upper ends of gripper arms 66 and 68 at locations 84 and 86, respectively, while the second actuator 88 is connected between the upper ends of gripper arms 74 and 76 at locations 90 and 92. The actuators 82 and 88 illustrated in the drawing are the piston and cylinder expansible chamber type, each comprising a piston within a cylinder and a piston rod connected to the piston and extending out one end of the cylinder. Fluid under pressure is admitted at the end of the cylinder opposite the piston rod to extend the actuator and close the gripper arms, while the fluid under pressure is admitted at the rod end of the cylinder to force the piston inwardly and contract the actuator and thus open the gripper arms. While actuators of this type provide certain advantages in carrying out my invention, it will be understood that it is not limited to such actuators and that other equivalent actuators may be employed if desired.

An additional hydraulic actuator 94 is connected between side frame member 58 and a downward projection from boom arm 32 at location 96 to provide for rotation of the grapple structure through an angle of approximately 90° about vertically disposed axis 98, a swivel joint being provided at 97 to permit such movement.

Operation of my material handling machine is illustrated by FIGURES 1 and 2. If it is desired to pick up a load of logs 100 as illustrated in FIGURE 2, actuators 34 are extended to pivot boom member 30 rearwardly to the position shown in solid lines in FIGURE 2. Simultaneously, actuators 82 and 88 are operated to open the gripper arms. When the solid line position of FIGURE 2 has been reached, actuators 82 and 88 are extended to close gripper arms 66 and 68 and 74 and 76, thus picking up logs 100 between them. Then, by operating actuators 34 to move the boom structure forwardly, the load may be moved to the position illustrated in FIGURE 1 wherein the grapple 44 and the load are disposed substantially within the pocket defined by the boom portions 28. While in this position the load may be transported by the vehicle 10.

The position illustrated in dot-dash lines in FIGURE 2 is illustrative of a position which the machine assumes upon suitable operation of actuators 34 and extension of actuators 38. This is a position which is frequently required when it is desired to deposit a load of logs or other items on a highway truck or railroad car.

FIGURES 5 and 6 of the drawing illustrate a trailer portion 14 which is generally similar to the trailer portion of FIGURES 1-3 inclusive; however, it will be observed that some parts are somewhat different in configuration in FIGURES 5 and 6 and that the trailer portion of these figures includes additional parts not found in the other embodiment. For the same or similar parts the same identifying numerals have been used in FIGURES 5 and 6 as in FIGURES 1-4.

Both FIGURES 5 and 6 show the grapple device 44 turned for carrying logs or other elongated pieces longitudinally of the vehicle 10. Referring again to the previously mentioned example of handling pulpwood, if the pulpwood is in 8 ft. lengths as is conventional in many areas it would be most conveniently transported in the manner shown in FIGURES 5 and 6, whereas if the pulpwood should be in 4 ft. lengths as is conventional in other areas it could be handled as illustrated in FIGURES 1-3 inclusive. In FIGURES 5 and 6 a crossbrace 141 is shown connected between gripper arms 76 and 68 and another crossbrace 143 is shown connected between the other two gripper arms, and the operation of the grapple when one or both of these crossbraces is used is explained in detail hereinafter. FIGURES 5 and 6 also show a pair of upstanding support members 145 and 147 which are connected along the sides of trailer frame 26 and extend upwardly to form a cradle for the gripper arms of the grapple 44 as illustrated. This is a very convenient arrangement for transferring the weight of the load to the frame when the load is being transported. Bracket 89 which appears on grapple side plate 60 in FIGURE 6 is to provide for the connection of one end of grapple rotating actuator 94.

While I have omitted from FIGURES 1-6 inclusive of the drawing, for the sake of simplicity, the conduits which conduct fluid under pressure to operate the various actuators it will be understood that these conduits are provided in the usual manner and are preferably supplied with fluid under pressure from a pump operated by the prime mover of vehicle 10. Suitable flexible sections of conventional construction are provided in the conduits to carry the fluid around movable joints in the machine.

FIGURE 7 shows schematically a typical fluid circuit for the actuators for the grapple and boom portions of the machine. A pump 102, which as indicated previously may be operated by the prime mover of vehicle 10, draws fluid from a reservoir or sump 104 and discharges it under pressure into line 106. A relief valve 107 of conventional construction is connected to line 106 to limit the pressure in line 106 to a predetermined amount and discharge excess fluid back into sump 104. A four-way valve 108 is provided for admitting fluid under pressure selectively through either of conduits 110 or 112 to actuators 34 while fluid is bled simultaneously from the opposite end of these actuators through valve 108 and conduits 114 and 138 back to the sump 104. Four-way valve 116 is similarly arranged to admit fluid through either of lines 118 and 120 to the selected end of actuators 38 while fluid discharged from these actuators returns through valve 116 and line 122 to line 138 and thence to the sump. The four-way valve 124 transmits fluid from the same source, line 106, through lines 126 and 128 to actuators 82 and 88. Fluid under pressure in line 126 is admitted simultaneously to one end of the actuators, while fluid transmitted through conduit 128 enters the other end of the two actuators simultaneously. Fluid bled from the non-pressure ends of these two actuators returns through line 126 or 128 and four-way valve 124 and line 130 to the sump. Actuator 94 for rotating the grapple is operated similarly by a four-way valve 132, conduits 134 and 136 which are connected between valve 132 and actuator 94, and conduit 138 which leads back to the sump 104.

The connection of the actuators 82 and 88 in parallel as shown in FIGURE 7 provides one of the advantages of the present invention when the grapple construction of FIGURES 1–4 is used in that it makes it possible for actuators 82 and 88 to operate different amounts even though they are energized simultaneously. Thus, if the load being picked up by the grapple 44 is irregular, such as is normally the case with logs, for example, the gripper arms on one side (74 and 76) may close different amounts than the gripper arms on the other side of the grapple (66 and 68) to accommodate such unevenness. This occurs because if one pair of gripper arms is stopped from further movement by the load between them the other pair can continue to move until it also is stopped by the load. This feature facilitates picking up irregular loads and also aids materially in retaining the load during transport.

If one or both the crossbraces 141 and 143 of FIGURES 5 and 6 are used obviously the action of the gripper arms will be modified. If one such brace is used the two gripper arms between which it is connected must, of course, move together and if both are used the gripper arms at both ends of the grapple must work together respectively. If the load is not too irregular or doesn't actually require the arrangement of FIGURES 1–3, the construction of FIGURES 5 and 6 frequently is more advantageous. When all of the gripper arms are free to operate individually as in FIGURES 1–4 it will be appreciated by those familiar with hydraulically operated devices that if the gripper arms become uneven and it is desired to align them again, it may be necessary to run the hydraulic actuators all the way to one extreme or the other of their travel, and wait until the last gripper arm has reached its extreme position, in order to accomplish such realignment. Such operation may take additional time which would not be necessary if crossbraces were used between the gripper arms at the ends of the grapple.

It will be observed in the drawing that each of boom members 30 and 32 has an outwardly curved portion confronting the other boom member. While it is not essential that both of these boom members have such outwardly curved portions it is important that at least one of them have such an outwardly curved portion confronting the other, to make it possible to move the load over the frame portion 26 of the machine and support it on the frame for transport as by means of the cradle members 145 and 147 of FIGURES 5 and 6. It will be appreciated that supporting the load on the frame portion of the machine in this manner relieves a considerable portion of the stress which otherwise would occur on the fluid actuators and boom and grapple structure due to tilting of the trailer portion 14 and shocks resulting from traversing rough terrain.

It will be appreciated that actuator 94 which is used to rotate the grapple 44 about vertically disposed axis 98 is useful for turning a load so that it may be carried transversely of the vehicle as illustrated in FIGURES 1–3 or longitudinally as illustrated in FIGURES 5 and 6. Actuator 94 also is useful in connection with the depositing of a load on a truck or other conveyance because, regardless of the relative positions of this material handling machine and the conveyance it is possible to deposit the load on the conveyance either transversely or longitudinally as desired.

While I have described and illustrated herein preferred embodiments of my invention, it will be understood that modifications may be made. I intend to cover by the appended claims all such modifications which fall within the true spirit and scope of my invention.

I claim:

1. A material handling machine comprising a two-wheeled tractor portion and a two-wheeled trailer portion, a combined draft and steering coupling connecting the said tractor and trailer portions, said draft and steering coupling including means whereby the said trailer portion pivots with respect to the tractor portion about a vertically disposed axis and about a horizontally disposed axis, the said trailer portion including a horizontally disposed frame portion and the wheels of the said trailer portion being disposed adjacent the rear extremity of the said frame portion, an upwardly disposed articulated boom portion pivotally mounted on the said frame portion adjacent the said rear extremity, the said boom portion comprising a first upwardly disposed elongated boom member having its lower end pivoted to the said frame and a second elongated boom member having one end thereof connected to the other end of the said first boom member and extending rearwardly therefrom, the said first boom member being constructed and arranged for selective movement forwardly and rearwardly of a vertically disposed position, first fluid operated expansible chamber power means connected between the said frame and the said first boom member for pivoting the said boom portion selectively between a rearwardly extending and a forwardly extending position and intermediate positions, second fluid operated expansible chamber power means connected between the said first and second boom members for selectively pivoting the latter upwardly and downwardly with respect to the former, downwardly extending grapple load engaging means connected to the rearward end of the said second boom member, means for operating the said load engaging means to pick up a load, and at least one of the said two boom members having an outwardly curved portion confronting the other when the said first boom member is in a forwardly extending position whereby the load held by the said load engaging means may be supported directly over the trailer wheels for transport.

2. A material handling machine comprising a two-wheeled tractor portion and two-wheeled trailer portion, a combined draft and steering coupling connecting the said tractor and trailer portions, said draft and steering coupling including means whereby the said trailer portion pivots with respect to the tractor portion about a vertically disposed axis and about a horizontally disposed axis, the said trailer portion including a horizontally disposed frame portion and the wheels of the said trailer portion being driven wheels disposed adjacent the rear extremity of the said frame portion, an upwardly disposed articulated boom portion pivotally mounted on the said frame portion adjacent the said rear extremity, the said boom portion comprising a first upwardly disposed elongated boom member having its lower end pivoted to the said frame and a second elongated boom member having one end thereof connected to the other end of the said first boom member and extending rearwardly therefrom, the said first boom member being constructed and arranged for selective movement forwardly and rearwardly of a vertically disposed position, first fluid operated expansible chamber power means connected between the said frame and the said first boom member for pivoting the said boom portion selectively between a rearwardly extending and a forwardly extending position and intermediate positions, second fluid operated expansible chamber power means connected between the said first and second boom members for selectively pivoting the latter upwardly and downwardly with respect to the former, said boom members defining a rearwardly facing pocket when said second boom member is in its downward position, and downwardly extending grapple load engaging means connected to the rear end of the said second boom member by means of a universal connection which provides for pivoting of the grapple load engaging means on the second boom member about transverse and longitudinally disposed axes, the said grapple load engaging means comprising a horizontally disposed frame structure, two pairs of gripper arms pivotally mounted on the said frame structure, the individual arms of both pairs being pivoted about the same two parallel axes, two fluid actuated power means for operating the said two pairs of gripper arms respectively, means for applying fluid pressure from the same source to both said power means simultaneously, and a fluid actuator connected between the said frame structure and a projection connected to the said second boom member whereby the said grapple load engaging means may be pivoted with respect to the said second boom member about a vertically disposed axis such that a load may be engaged and disposed at least partially within said pocket and over said trailer wheels for transportation.

3. A material handling machine comprising a horizontally disposed frame portion, an upwardly disposed articulated boom portion piovtally mounted on the said frame portion, the said boom portion comprising a first boom member pivotally connected directly to the said frame portion adjacent the lower end of the said boom member and arranged to move through a vertically disposed position and fore and aft of such vertically disposed position, the said boom portion also including a second boom member pivotally connected to the said first boom member adjacent the upper end of the latter, first power means connected between the said frame and said first boom member for pivoting the said boom portion with respect to the said frame, second power means connected between the said first and second boom members for pivoting the latter with respect to the former, the said boom members defining a rearwardly facing pocket in a load carrying position, load engaging means connected to the said second boom member for pivotal movement about horizontal and vertical axes and disposable at least partially within said pocket, a pair of upwardly extending support members secured to the said frame and disposed to cradle the said load engaging means therebetween, and third power means connected between the said load engaging means and said second boom member for pivoting said load engaging means about the vertical axis thereof to a load carrying position so that said load engaging means is cradled between the said support members and at least partially disposed within the said pocket when the said boom members are in their load carrying position.

References Cited in the file of this patent

UNITED STATES PATENTS

| | | |
|---|---|---|
| 1,346,160 | Barlow | July 13, 1920 |
| 2,550,185 | Busch | Apr. 24, 1951 |
| 2,720,988 | McColl | Oct. 18, 1955 |
| 2,725,996 | Britton | Dec. 6, 1955 |
| 2,731,163 | Wills | Jan. 17, 1956 |
| 2,754,016 | Anderson | July 10, 1956 |
| 2,814,396 | Neale | Nov. 26, 1957 |
| 2,832,483 | Jones | Apr. 29, 1958 |
| 2,862,756 | Larson | Dec. 2, 1958 |